Patented Dec. 1, 1931

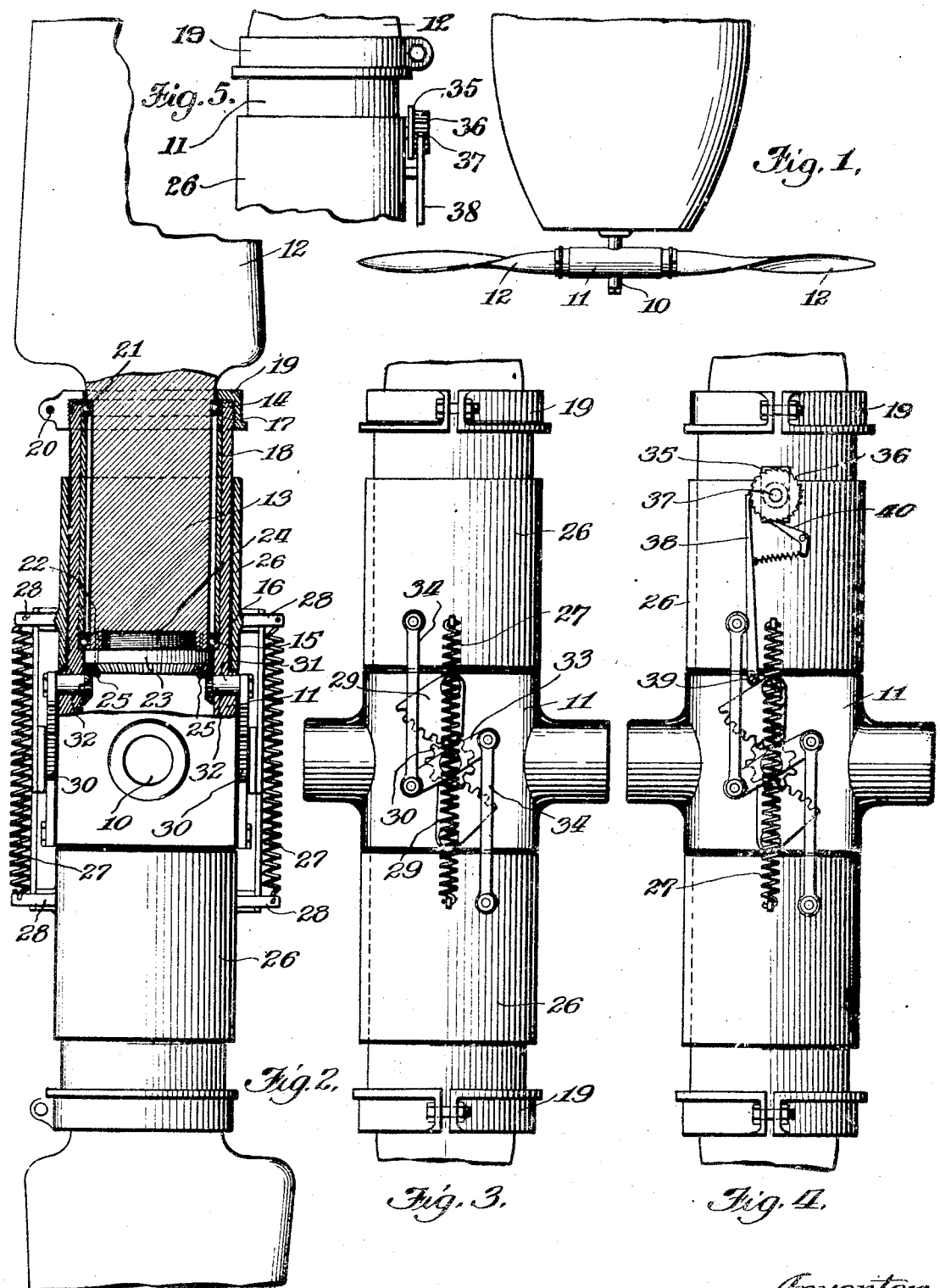

1,834,350

UNITED STATES PATENT OFFICE

RUDOLPH W. SCHROEDER, OF GLENCOE, ILLINOIS

PROPELLER

Application filed September 19, 1927. Serial No. 220,516.

This invention relates to propellers for flying machines and has for one of its objects the provision of a propeller in which the pitch of the blades may be adjusted.

A further object of the invention is to provide improved means for effecting the adjustment of the propeller blade pitch.

Other objects and advantages will appear from the following description.

The invention is exemplified in the combination and arrangement of parts shown in the accompanying drawings and described in the following specification, and it is more particularly pointed out in the appended claims.

In the drawings—

Fig. 1 is a top plan view of the front end of an aeroplane having a propeller embodying the present invention mounted thereon;

Fig. 2 is a fragmentary front elevation of an aeroplane propeller, with parts in section, showing one embodiment of the present invention;

Fig. 3 is a side elevation of the mechanism shown in Fig. 2;

Fig. 4 is a view similar to Fig. 3 showing a modified form of the present invention; and Fig. 5 is a fragmentary view of the stop mechanism shown in Fig. 4 and is a view looking from the left of that figure.

In the operation of aeroplanes it has been found that the same pitch of the propeller will not produce the most efficient operation for all conditions. When the machine is rising on the take-off a low pitch is desirable, because great power is necessary at slow speed. When the machine is in rapid flight, however, a high pitch is desirable. Where the propeller has a fixed pitch, it has been common practice to compromise between the pitch best suited for a take-off and the pitch best suitable for rapid flight. The consequence is that the propeller is not adapted for best results under either condition. If a propeller is employed which is suitable for developing the greatest power on the take-off, it is necessary to race the engine to secure traction when the machine is in level flight. If a propeller of high pitch is employed suitable for rapid flight it is difficult to lift the machine from the ground, because the action is similar to that experienced when an effort is made to start an automobile in high gear.

The present invention provides means for changing the pitch of the propeller blades so that a low pitch may be employed in starting or climbing, and a high pitch employed for level flight. The effect is similar to that secured by the gear shift in an automobile. The pitch of the blades may be controlled either automatically or may be shifted at the will of the operator. Mechanism is shown for either form of control in the accompanying drawings. Where automatic shifting is effected, the operation is similar to that of a governor for an engine, except that instead of regulating the amount of power in the engine to regulate the speed, the load upon the engine is varied so that the load is kept practically constant at the speed of maximum efficiency of the engine.

In the drawings, the numeral 10 designates the engine shaft of an aeroplane upon which is mounted a hub 11 for supporting the propeller blades. The propeller blades 12 are provided with spindles 13 which are journaled in opposite ends of the hub 11 on ball bearings 14 and 15. Raceways 16 and 17 are mounted in the hub 11 and are held in spaced relation by a spacing collar 18. The raceways and collar are held in place in the hub 11 by a split cap or collar 19 screwed on the end of the sleeve and locked in place by a bolt 20. Raceways 21 and 22 are fixed to the spindle 13 to engage the ball bearings 14 and 15. The bearings thus provided support the propeller blades against both end and side thrust. A gear 23 is provided with a threaded stud 24 which is screwed into the end of the spindle 13 and bears against the ball race 22 to hold the spindle from moving outwardly. The gear 23 is locked in position by screws 25.

Sleeves 26 are slidably mounted on opposite ends of the hub 11 and are restrained from outward movement by springs 27 which are connected to lugs 28 projecting outwardly from the sleeve 26. The springs 28 have sufficient force to hold the sleeves 26 in their innermost positions against stop shoulders on the hub 11 at slow rotation of the propeller shaft, but at higher speeds the sleeves 26 move outwardly under centrifugal force different amounts, depending upon the rate of speed. Rotation is imparted to the blades 12 by means of gear segments 29 which mesh with pinions 30 journaled on stud shafts supported at opposite sides of the hub 11. Each gear segment 29 is fixed to a shaft 31 journaled in the hub 11 and provided with a pinion 32 which meshes with the pinion 23. Arms 33 are fixed to the pinions 30 and have their opposite ends connected by links 34 with the sleeves 26. Any outward movement of the sleeves 26 will move the lever 33 and consequently rotate the pinion 30 and impart rotation to the gear 23 and the propeller blades 12. The sleeves 26 are constrained to equal outward movement by the levers 33 and connecting links 34. This inter-connection also insures equal rotation of the blades 12 so that both blades will be arranged at the same pitch angle.

With a construction of this kind, the engine throttle may be wide open when the machine is started and during ascent the blades will remain at a low pitch angle to exert maximum power. When the machine has reached a sufficient height for level flight and has gained sufficient speed that the power required begins to decrease, the speed of the engine will have a tendency to increase because of the decreased resistance. Any increase in speed, however, will move the sleeves 26 outwardly, increasing the pitch angle of the propeller blades and thus adding to the resistance offered by the rotation of the blades and utilizing the additional available power of the engine for increasing the speed of flight. The parts may be so proportioned that the speed of the engine will remain very close to the speed at which the engine develops its maximum efficiency. If the speed of the engine increases, the propeller blades are automatically turned to exert greater traction force and increase the velocity of the plane, thus adding a greater useful load to the engine, the load being automatically increased by increase velocity of the plane to maintain an engine speed approximately that at which greatest efficiency is developed. If the throttle is moved to reduce the amount of fuel supply to the engine, a slight decrease in speed of the engine will reduce the pitch angle of the propeller blades, thus decreasing the load upon the engine so that the speed of rotation of the engine will remain practically the same, but the velocity of the ship will decrease. It will be seen that the device provides governing mechanism which varies the load to maintain a substantially constant engine speed rather than changing the supply of motive fluid to the engine as in the ordinary form of governing mechanism. This permits the amount of power developed by the engine to be controlled by the operator and the load will be automatically adjusted to the power developed so that the engine speed will vary only between sufficient limits to operate the governing mechanism.

In the form of the invention shown in Fig. 4, means is provided for permitting the operator to control the pitch of the propeller blades. The construction is similar to that of the figures already described, except that a limit stop is provided for controlling the outward movement of the sleeves 26 and this stop may be adjusted under the control of the operator. The stop comprises a block 35 fixed to a ratchet wheel 36 and journaled on a stud shaft 37 secured one to each of the sleeves 26. The stop has a greater dimension in one direction than in the other. When the stop is in the position shown in Fig. 4 and the sleeve 26 moves outwardly, the end of the stop will engage the collar 19 and arrest the outward movement of the sleeve 26 when the propeller blades 12 have a pitch angle suitable for take-off or ascent. This corresponds to a low gear of an automobile. When the stop 35 is given a quarter turn from the position shown in Fig. 4, the broad side of the stop 35 will be presented to the collar 19 so that the sleeve is permitted to move outwardly a sufficient amount to permit a greater pitch of the propeller blades corresponding to high gear. A pawl 38 is pivoted at 39 on the hub 11 and the end of the pawl engages the teeth of the ratchet wheel 36. A detent 40 is provided for preventing reverse rotation of the ratchet wheel. Each time the sleeve 26 moves outwardly and returns, a quarter turn will be imparted to the stop 35. Contact between the faces of the stop 35 and the collar 19 will accurately position the stop to a complete quarter turn in case of any inequality in the rotation of the ratchet wheel 36 for different movements of the sleeve 26. With mechanism of this kind, when the pilot wishes to start he will open his engine to full speed while the brakes are on or while the wheels are propped. He can tell by the resulting speed whether the blades are set at high or low pitch. If the blades are at low pitch, he releases his brakes and starts. If the blades are at high pitch, he closes his throttle, permitting the sleeves 26 to move inwardly under the force of the springs 27. When he again opens his throttle, the stop 35 will be moved a quarter turn so that the propeller blades will be arrested at low pitch. After he has reached the desired height, he can shift the blades to high pitch by shutting off the engine for a sufficient period to permit the sleeves 26 to move inwardly and again open the throttle to increase the speed of the engine. This will cause a quarter turn to the stop 35 so that the propeller blades will now be located at high pitch. When the pilot wishes to change the position of the propeller blades, it is only necessary for him to throttle the engine momentarily and then turn on the power, whereupon the propeller blades will be moved from the position they were in to the desired new position.

I claim:—

1. An aeroplane propeller comprising adjustable blades, centrifugal governing mechanism for changing the pitch of said blades, and self-adjusting stop mechanism for limiting the operation of said centrifugal governing mechanism to determine the pitch of said blades.

2. The combination with a propeller having adjustable blades, of centrifugal governing mechanism for changing the pitch of said blades, adjustable stop mechanism for limiting the adjustment of said blades to determine different pitch positions of said blades, and means operable by the movement of said governing mechanism for changing said stop mechanism.

3. An aeroplane propeller having a hub portion, a propeller blade having a spindle journaled in said hub portion, a gear attached to said spindle, a sleeve slidably mounted on said hub portion, and means connected with said sleeve for rotating said gear and spindle when said sleeve is moved radially on said hub portion.

4. An aeroplane propeller comprising a hub portion having oppositely extending cylindrical portions, propeller blades having spindles journaled in said cylindrical portions, each propeller blade having a gear secured to the inner end thereof, shafts journaled in said hub portion and having pinions meshing with said gears, sleeves slidably mounted on said oppositely extending cylindrical portions, a spring connecting said sleeves, a lever journaled on said hub portion, links connecting opposite ends of said lever with said sleeves, a pinion connected with said lever, and gear segments mounted on said shafts and meshing with said last-named pinion to rotate the gears connected with said propeller blade spindles when said sleeves move radially on said cylinders.

5. In an aeroplane propeller, the combination with a hub portion, of bearings extending outwardly therefrom to form journals for propeller blades, propeller blades journaled in said bearings, members movable toward and away from said hub portion and operatively connected to said blades to control the pitch of said blades, a stop for limiting the outward movement of said members, and means for automatically rendering said stop inoperative.

6. In an aeroplane propeller, the combination with a hub portion, of bearings extending outwardly therefrom to form journals for propeller blades, propeller blades journaled in said bearings, members movable toward and away from said hub portion and operatively connected to said blades to control the pitch of said blades, a stop for limiting the outward movement of said members, and means for rendering said stop inoperative adapted to be controlled by the speed of the motor of the aeroplane in which the propeller is to be used.

7. In an aeroplane propeller, the combination with a hub portion, of bearings extending outwardly therefrom to form journals for propeller blades, propeller blades journaled in said bearings, members movable toward and away from said hub portion and operatively connected to said blades to control the pitch of said blades, a stop for limiting the outward movement of said members, and a pawl and ratchet connection between said members and hub for rendering said stop inoperative.

8. In an aeroplane propeller, the combination with a hub portion, of bearings extending outwardly therefrom to form journals for propeller blades, propeller blades journaled in said bearings, members movable toward and away from said hub portion and operatively connected to said blades to control the pitch of said blades, a stop on one of said members for limiting the outward movement of said members, and a pawl and ratchet connection between said stop and hub for selectively moving the stop to operative or inoperative position.

9. In an aeroplane propeller, the combination with a hub portion, of bearings extending outwardly therefrom to form journals for propeller blades, propeller blades journaled in said bearings and adapted to rotate therein, gears for rotating said blades in opposite directions to simultaneously vary the pitch of each blade, sleeves slidable along said bearings toward and away from said hub, a fixed stop for limiting the movement of the sleeves away from the hub, an adjustable stop on one of said sleeves, a pawl and ratchet connection between said adjustable stop and hub adapted to move the stop from an operative to an inoperative position, and interconnecting means between said sleeves and gears to rotate said gears as said sleeves move along said bearings, said adjustable stop limiting the outward movement of said sleeves when in operative position by contact with the fixed stop and said sleeve limiting the outward movement thereof by its contact with the fixed stop when the adjustable stop is in inoperative position.

10. An air vehicle propeller comprising a member having adjustable blades thereon, mechanism for changing the pitch of said blades, means for selectively controlling the pitch of said blades, and means controlled by the rotation of said propeller for actuating the means which selects the pitch of said blades.

11. An air vehicle propeller comprising a plurality of blades, a hub portion on which said blades are angularly adjustable to vary the pitch thereof, mechanism for changing the pitch of said blades, mechanism for selecting the desired pitch for said blades, and means controlled by the rotation of said propeller as a unit for actuating said last mentioned mechanism.

12. A propeller comprising a hub portion, blades angularly adjustable on said hub portion, mechanism for changing the pitch for said blades automatically, and means for selecting the desired maximum pitch for said blades, said last mentioned means being controlled by the speed of rotation of said hub portion.

13. An aeroplane propeller comprising a rotating hub portion having blades angularly adjustable on said hub portion for varying the pitch thereof, centrifugal mechanism for increasing the pitch of said blades, and self-adjusting stop mechanism for determining the maximum pitch to be given to said blades.

14. An aeroplane propeller comprising a plurality of blades adjustable angularly to vary their pitch, centrifugal governing mechanism for changing the pitch of said blades, and adjustable stop mechanism for limiting the pitch given to said blades, said adjustable stop mechanism being adjustable by a change in the speed of rotation of said propeller.

15. An aeroplane propeller comprising a hub portion, propeller blades journaled for angular adjustment on said hub portion to vary the pitch of said blades, members slidable outwardly in the direction of the axes of rotation of said blades, a train of gears connecting said members with said blades so that when said members move outwardly from said hub portion said gearing will rotate said propeller blades, and means for resisting outward movement of said members away from said hub portion.

16. An aeroplane propeller having a hub portion, propeller blades on said hub portion mounted for angular adjustment to vary their pitch, a weighted member slidable in a direction parallel with the axis of rotation of one of said propeller blades, and a train of gears connected with said member and said propeller blades for increasing the pitch of said blades as said member is moved outwardly away from said hub portion.

17. An aeroplane propeller comprising a hub portion having oppositely extending bearing portions, propeller blades journaled in said bearing portions and adjustable about axes substantially perpendicular to the axis of said hub portion, gears secured to each of said propeller blades for rotating the same, gears meshing with the gears on said blades, weight members slidable along said bearing portions and operatively connected to said last mentioned gears for rotating the same, and springs for resisting movement of said weight members in a direction outwardly from said hub portion.

18. An aeroplane propeller comprising blades angularly adjustable to vary the pitch thereof, governing mechanism for varying the pitch of said blades, and automatically self-adjusting stop mechanism for limiting the operation of said governing mechanism to thereby selectively determine the pitch of said blades.

19. An aeroplane propeller comprising blades angularly adjustable to vary the pitch thereof, governing mechanism for varying the pitch of said blades, and adjustable stop mechanism for limiting the operation of said governing mechanism to thereby selectively determine the pitch of said blades, said stop mechanism being controlled by the speed of rotation of said propeller.

20. An aeroplane propeller comprising a hub portion, propeller blades mounted for angular adjustment on said hub portion to thereby vary the pitch of said blades, sleeves slidably mounted on said hub portion, said sleeves being mounted so as to be moved by centrifugal force when said hub portion is rotated, means for connecting said sleeves with said blades for rotating said blades to thereby vary the angular pitch thereof, and adjustable stop mechanism controlled by the movements of said sleeves for selectively determining the pitch which is to be given to said blades.

21. An aeroplane propeller comprising a hub portion, propeller blades journaled for angular adjustment on said hub portion to vary the pitch of said blades, members slidable outwardly in the direction of the axes of rotation of said blades, a gear operatively connected to each of said blades, additional gears in mesh with said first mentioned gears, gear segments rigidly attached to said last mentioned gears, a gear meshing with pairs of gear segments attached to the gears which operate different ones of said blades, centrifugal governing mechanism slidable outwardly in the direction of the axes of rotation of said blades, and means for resisting the outward movement of said members away from said hub portion.

22. An aeroplane propeller comprising adjustable blades, centrifugal means for changing the pitch of said blades, an adjustable stop mechanism for limiting the movement of said blades under the action of said centrifugal means, to thereby determine the pitch of said blades while said blades rotate, and self adjusting means operable while the propeller is in motion for changing the position of said adjustable stop to selectively dedetermine the position to which blades may be moved under the action of the centrifugal force.

23. A propeller comprising a hub portion, blades angularly adjustable on said hub portion, mechanism for changing the pitch of said blades automatically, and means operator-controlled while the propeller is rotating for selecting the desired maximum pitch for said blades, said last mentioned means being controlled by the speed of rotation of said hub portion and said mechanism for changing the pitch of said blades being such as to hold said blades in the maximum permitted position while the blades are operating under normal propeller speeds during flight.

24. An aeroplane propeller comprising blades angularly adjustable to vary the pitch thereof, governing mechanism for varying the pitch of said blades, and adjustable stop mechanism carried by said governing mechanism for limiting the operation of said governing mechanism to thereby selectively determine the pitch of said blades, said stop mechanism being operator-controlled during the rotation of said propeller about its axis.

25. An aeroplane propeller comprising a hub portion having oppositely extending cylindrical portions, propeller blades having spindles journaled in said cylindrical portions, each propeller blade having a gear secured to the inner end thereof, shafts journaled in said hub portions and having pinions meshing with said gears, sleeves slidably mounted on said oppositely extending cylindrical portions, a spring connecting said sleeves to draw said sleeves toward each other, a lever journaled on said hub portion, links connecting opposite ends of said lever with said sleeves, a pinion connected with said lever, gear segments secured to said shafts and meshing with said last named pinion to rotate the gears connected with said propeller blade spindles when said sleeves move radially on said cylinders, and an adjustable stop for limiting the movements of said sleeves under the action of centrifugal force and thereby limiting the angular positions of said blades.

26. An aeroplane propeller comprising a plurality of blades angularly movable about their own axes, centrifugal mechanism for moving said blades in one direction about their axes, an automatically adjustable stop for limiting the movement of said blades in that direction under the action of said centrifugal mechanism, said stop mechanism being adapted to stop the movement of said blades before the blades have reached the full extent of their movement under the action of said centrifugal means so that the excess pressure which normally would move the blades to an increased angular position past that position wherein the blade's rotation is arrested, is utilized to maintain said blade in its limiting position as determined by said stop, even though the resistance to the rotation of said propeller varies somewhat to the normal.

In testimony whereof I have signed my name to this specification on this 17th day of September, A. D. 1927.

RUDOLPH W. SCHROEDER.